United States Patent [19]
Lightfoot

[11] 3,901,657
[45] Aug. 26, 1975

[54] DEVICE FOR TESTING SOLUTIONS AND BODY FLUIDS

[75] Inventor: Charles L. Lightfoot, Chatham, N.J.

[73] Assignee: Sun Scientific, Incorporated, New York, N.Y.

[22] Filed: Apr. 29, 1974

[21] Appl. No.: 465,330

[52] U.S. Cl............ 23/253 TP; 23/230 B; 252/408
[51] Int. Cl.²................. G01N 33/16; G01N 21/06
[58] Field of Search ............... 23/253 TP, 230 B; 116/114 AM; 252/408

[56] References Cited
UNITED STATES PATENTS

| | | | |
|---|---|---|---|
| 3,006,735 | 10/1961 | Jordan | 23/253 TP |
| 3,511,608 | 5/1970 | Anderson | 23/253 TP |
| 3,723,064 | 3/1973 | Liotta | 23/253 TP |
| 3,798,004 | 3/1974 | Zerachia et al. | 23/253 TP |

OTHER PUBLICATIONS
Clarke, "Isolation and Identification of Drugs," The Pharmaceutical Press, London, 1969, pp. 431–432.

*Primary Examiner*—R. E. Serwin
*Attorney, Agent, or Firm*—Burns, Doane, Swecker & Mathis

[57] ABSTRACT

A multi-layer device suitable for the colorimetric determination of the presence of a particular compound in a test solution is disclosed. The first layer contains an agent capable of concentrating the particular compound onto the surface of the layer, when the device is placed in a solution containing the particular compound. Subsequent reagent layers are incorporated as required to supply reagents, through diffusion, as needed to produce the end result of a color reaction on the first layer. Barrier layers may be incorporated between reagent layers.

A new colorimetric method for the detection of morphine is also disclosed which may be adapted for use with the multi-layer device.

13 Claims, 5 Drawing Figures

FIG.3

PATENTED AUG 26 1975                                              3,901,657
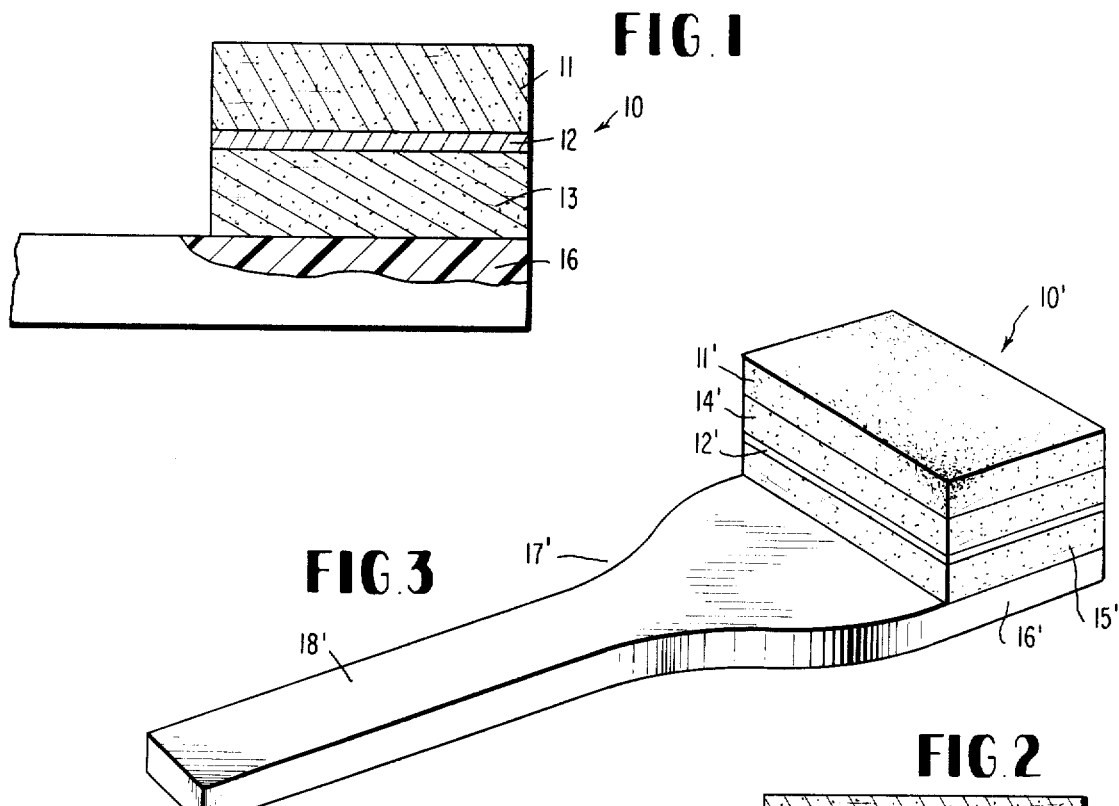
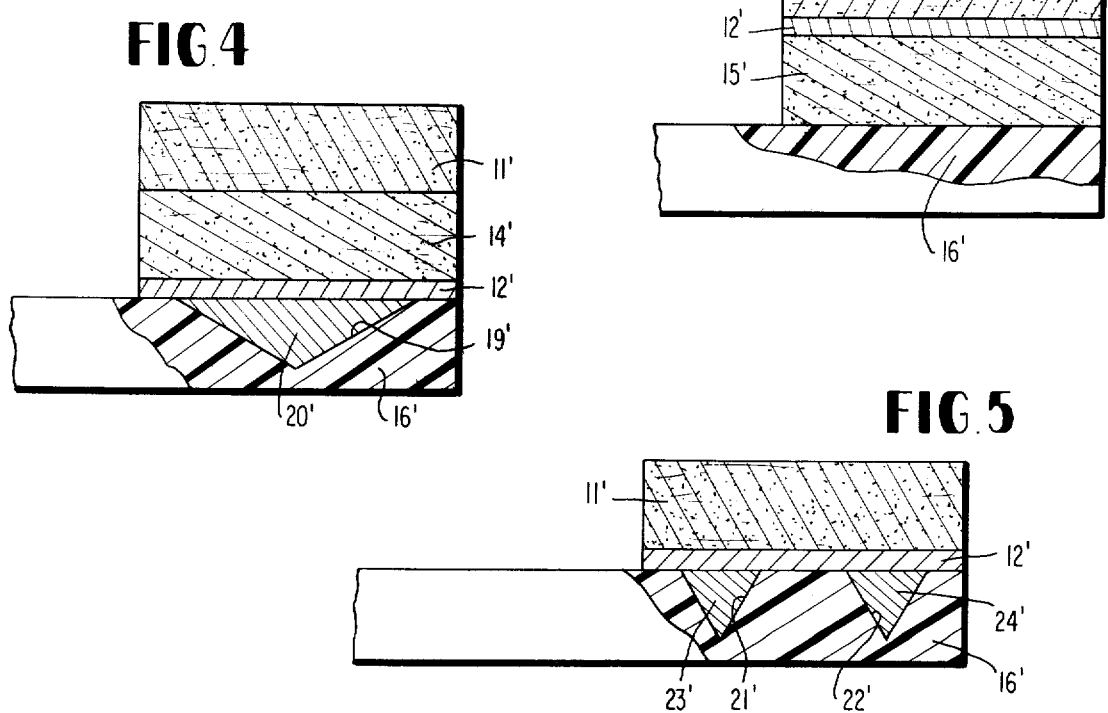

DEVICE FOR TESTING SOLUTIONS AND BODY FLUIDS

BACKGROUND OF THE INVENTION

A simple colorimetric determination for the presence of a particular compound would be extremely useful in certain areas such as, for example, in water pollution detection, in the presence of adulterous bacterial products or other noxious or toxious materials in foodstuffs or beverages, in the testing of industrial effluents, quality control and chemical, pharmaceutical and allied manufacturing operations, and in the detection of drugs including narcotics in body fluids such as urine.

Colorimetric determinations for particular compounds or classes of compounds are extremely well-known to chemists. They vary in complexity from simple qualitative "spot tests" (which demonstrate the presence or absence of a desired compound) to extremely precise quantitative determinations involving elaborate and expensive instrumentation.

The utility of some of these color-forming reactions was greatly extended by incorporating the color-forming reagents on bibulous paper strips. Such devices could be quickly and easily used by untrained as well as trained personnel for both qualitative and quantitative determinations. These strips are also well adapted for use in the field where it may be difficult or impossible to carry reagents and solutions such as are present in a laboratory.

To improve the versatility and sensitivity of these paper strips and to extend their usefulness, multi-layered structures or articles have been fabricated and are in commercial use in a number of areas of chemistry and biology for a wide variety of solutions and body fluids. See, for example, U.S. Pat. Nos. 2,249,867; 3,006,735; 3,011,874; 3,232,710; 3,351,254; 3,359,180; 3,511,608 and 3,723,064.

In such multi-layered articles, a series of reactions, diffusions, bacteriological growths, or the like may be made to occur to produce a specific color or colors on one or more layers under defined conditions. Such multi-layered articles can be extremely useful in the hands of both trained and untrained personnel wherever a suitable colorimetric reaction can be translated from one or more solution reactions to a layered article. In general, the sensitivity of the multi-layered article is approximately the same as that of the corresponding solution reaction carried out in the hands of a competent chemist.

A highly sensitive, easily-read test for the detection of narcotics such as morphine in urine would be extremely helpful in a drug program. Narcotic screening has become extensive practice in industry, business, the Armed Forces, schools and in the courts and prison systems. Such screening is used both as a pre-employment procedure and as a monitoring tool. Heroin is, unfortunately, widespread in usage in society and is devastating in its direct effects and its social effects. Morphine, a metabolite of heroin, is present in the urine of a heroin user, and a need has arisen for a rapid detection of morphine in urine. The present methods for the detection of morphine in urine are relatively costly and time consuming and must, in general, be performed by qualified personnel in well-equipped laboratories. It would be highly desirable and useful to be able to carry out a quick test of the presence of morphine in urine by a person who is untrained in chemical laboratory manipulations and who does not have at his disposal the instrumentation and laboratory equipment required in the present methods. For validity, such a test method must have a sensitivity to morphine in urine of approximately 1 microgram per milliliter of solution and must not require more than 25 to 50 milliliters of urine.

OBJECTS AND SUMMARY OF THE INVENTION

It is an object of this invention to provide a multi-layer contact or immersion device suitable for the detection of a reference compound presend in minute amounts in a particular solution.

It is another object of the present invention to provide a multi-layered article which is broadly adaptable to a wide variety of colorimetric reactions and which will increase the sensitivity of the color reaction by several fold over the corresponding solution reaction.

It is also an object of this invention to provide a new color reaction for morphine which is highly selective and provides high sensitivity for morphine in solution in the presence of other organic materials of body origin.

It is a further object of this invention to provide a multi-layered immersion device capable of rapidly and colorimetrically detecting, in the hands of untrained people, extremely minute amounts of a reference material such as morphine in solutions and body fluids.

In one other aspect, the present invention provides a process for detecting morphine in a solution which comprises mixing said solution with a periodate reagent and pyridine to convert any morphine present to a chromogenic compound and contacting the resulting solution with a strong base to form a visually observable indication of the presence of morphine.

In another aspect of this invention, there is provided a reactive device capable of converting morphine to a chromogenic compound comprising a first portion including a morphinophilic agent and a second portion containing a periodate reagent capable of reacting with morphine to produce a chromogenic compound which produces a visually observable color at a pH of about 11 to 13.

In still another aspect of the present invention, there is provided a multi-portion test device suitable for the colorimetric detection of morphine in a solution by contact therewith comprising a first portion containing a morphinophilic agent whereby morphine in a contacted solution is concentrated in said first portion; a second portion containing a reagent capable of converting morphine to a chromogenic compound, said reagent comprising pyridine and a compound selected from the group consisting of paraperiodic acid and its soluble salts and esters; and a third portion containing a strong base, said portions being arranged whereby when the test device is contacted with the said solution, the morphine is concentrated onto the first portion and the reagent, base and reaction products may permeate through all the portions to form a visually observable color on said first portion.

In still a further aspect of the present invention, there is provided a multi-portion device capable of detecting a reference compound present in minute amounts in a particular solution comprising a first layer including an agent having an affinity for the reference compound whereby said compound is concentrated and maintained in said portion in an amount sufficient to be detected after contact with the particular solution; and at least one subselayer adjacent to the first layer including an agent capable of permeating into said first layer after contact with the particular solution and reacting with said reference compound in said first layer to form a visually observable color compound.

DESCRIPTION OF THE DRAWINGS

FIG. 1 is a schematic representation of one embodiment of a multi-layer device of the present invention;

FIG. 2 is a schematic representation of another embodiment of a multi-layer device of the present invention;

FIG. 3 is a schematic representation of a specific embodiment of the multi-layered device of the present invention especially adapted for the detection of morphine in solution;

FIG. 4 is a schematic representation of another specific embodiment of the multi-layered device of the present invention especially adapted for the detection of morphine in solution; and FIG. 5 is a schematic representation of another specific embodiment of the multi-layered device of the present invention especially adapted for the detection of morphine in solution.

DESCRIPTION OF THE PREFERRED EMBODIMENTS

FIG. 1 is a schematic representation of a multi-layer test device indicated generally as 10 designed to effect concentration of a reference chemical entity onto a small area and subjecting that substance to one further sequential reaction for detection or estimation of the presence of the chemical entity by formation of color on layer 11.

The outermost layer 11 of the multi-layer device 10 serves to concentrate the reference compound under investigation from the particular solution being tested onto a small surface area. This layer 11 generally includes an agent which has an affinity for the reference compound whereby the compound is concentrated in the layer. The layer 11 may consist, for example, of a polymeric or non-polymeric material containing functional groups which are capable of reacting with, absorbing, or otherwise combining or attracting the substance or substances to be detected. For metals and for cations and for basic organic compounds such as alkaloids, amphetamines, synthetic analgesics, catecholamines and other nitrogenous bases, this layer 11 may, for example, consist of an acidic polymeric material such as a cationic exchange resin material either as a film or supported and maintained on a fibrous of film base, a fibrous acidic polymer or an acidic polymer supported and maintained on a fibrous material such as paper or glass roll. This layer may also consist of an acidic resin in granular or microspherical form attached to, maintained on, or embedded in a fibrous substrate. In some instances, an organic material having acidic groups either as a compound or a partially polymerized solid, may be allowed to react with paper to provide a first layer in which some functional groups of the acidic material are anchored firmly to the paper and others are free to react with the sought cationic material.

If the reference compound is anionic or tends to become anionic under certain conditions (e.g., an amphoteric compound in basic solution) then the material chosen for layer 11 may contain positively charged functional groups. For example, layer 11 may contain an anionic exchange resin attached to, maintained on or embedded in a substrate such as paper or glass fiber or the like. Alternatively, a paper substrate may be first contacted with an organic compound which contains several functional groups some of which groups will react with the paper to form a bond and some other functional groups (such as, for example, amino groups or substituted amino groups) which become positively charged in solution and therefore react preferentially with negatively charged ions and compouns which are or become anionic in the solution.

The outermost layer 11 may contain adjacent thereto a permeable barrier layer 12 which may be utilized to separate the reagents present in successive reactive layers, to introduce time delays into the reaction sequence or protect the reagent in a given layer from temporary atmospheric exposure. In many situations, the barrier layer may be omitted, e.g., where no time delay is required for the introduction of the reagent or reagents into layer 11, where no protection is necessary for the reagent in the successive layers or where separation of the reagents is unnecessary.

The next or inner layer 13 adjacent to either the barrier layer or the outermost layer 11 includes at least one reagent capable of permeating into the said outermost layer 11 after contact with the particular solution and reacting with the reference compound concentrated thereon. The paricular reagent utilized will vary depending upon the particular reference compound under investigation and the mechanism by which an observable color compound may be formed for that reference compound.

The reagent may react directly with the reference compound to form a visually observed color on the surface of layer 11 or the reagent and reference compound may react to form a chromogenic compound which reacts with one or more other reagents to form the visually observable color on the surface of layer 11.

In some cases where the color producing reaction requires a particular pH range to give the preferred color, a suitable compatible acid or base may be incorporated with the reagent in layer 13 to provide the desired pH adjustment at the surface of layer 11 as the reagent and pH adjusting compound in layer 13 diffuse to layer 11. The acid or base pH adjustment compound may also be incorporated into the multi-layer device in a separate layer which may be situated between layers 12 and 13 or below layer 13.

For some colorimetric reactions, color production is the result of a number of successive sequential chemical steps which must be carried out in the precise order to produce the desired result. For these reactions, successive layers each containing a reagent may be constructed with the proper barrier layers, if any, to permit a reagent contained in a given layer to diffuse through the layers, react with reagents in other layers and ultimately to provide a reagent which will react with the reference compound on the surface of the outermost layer 11.

FIG. 2 illustrates a multi-layer device 10' which includes a first outermost layer 11' which is essentially identical in construction and function to layer 11 of FIG. 1. Adjacent to layer 11' is layer 14' which contains a reagent compound capable of permeating into layer 11' when the structure is contacted with the reference compound-containing solution and reacting with the reference compound concentrated on the surface of layer 11' to produce a chromogenic compound. Adjacent to inner layer 14' is another layer 15' which includes an agent capable of permeating through layer 14' and into layer 11' and reacting with the chromogenic compound formed by the reaction of the reagent from layer 14' to form a visually observable compound on the surface of the layer 11.

In this manner, detection of the reference compound can be visually determined with high sensitivity after immersion in the particular solution by the sequence of reactions as follows:

1. Concentration of the reference compound on layer 11';
2. Reaction of the concentrated reference compound with the reagent from layer 14' to form a chromogenic compound; followed by
3. Reaction of the reagent from layer 15' with the reaction product to provide a visually observable color on the surface of layer 11'.

A barrier layer 12' is similar in function to barrier layer 12 described above with reference to FIG. 1 may be utilized between the two inner layers 14' and 15'.

The multi-layer device 10' of the present invention also may be provided with a backing layer 16' which provides the device with stiffness and rigidity and which may be used as a "handle" for inserting the reactive device into a solution and isolating the user from the material to be analyzed. The backing portion 16' generally has essentially the same surface area sa the area of the adjacent layer. In some instances, this backing layer may contain grooves, slots, dimples, or other receptacle areas which may contain one or more reagents which are permitted to permeate or diffuse in an appropriate manner into the bibulous reaction medium above the backing layer. The receptacle area may be formed in the backing layer by any suitable technique such as, for example, injection molding. The backing layer 16' may be formed of a suitable rigid, impermeable, non-reactive material such as, for example, a synthetic resinous material like methyl methacrylate, polyethylene, polyvinyl chloride or the like.

A specific embodiment of the multi-layer test device of the present invention is illustrated in FIG. 3 in which a three-layer device as shown in FIG. 2 is contained on an elongated member 17' having both a backing portion 16' which is at least substantially contiguous with the surface area of the adjacent inner layer 15' and a handle portion 18' extending outwardly therefrom such that an investigator may grip the device and insert the colorimetric test area (i.e., the layered portion) into the test solution while the handle portion is not in contact therewith. Contamination of the test solution and/or user is thus avoided.

FIG. 4 illustrates a variation of the multi-portioned device of FIG. 2 in which layer 15' is replaced by the receptacle 19' containing a reagent identified generally as 20'. Similarly, FIG. 5 illustrates a variation of the multi-portioned device of FIG. 2 in which the backing portion 16' is provided with two receptacle areas 21' and 22' each containing a reagent indicated generally as 23' and 24', respectively. The portions 11', 14' and 16' and barrier layer 12' in FIGS. 4 and 5 correspond to the portions and layers as described above with respect to FIG. 2.

It will be understood that the multi-layer device of the present invention may be formed with more than three layers depending upon the particular color-forming reaction sequence utilized. In addition, one or more of the barrier layers may be omitted if required. Generally, the multi-layer testing device of the present invention comprises at least the outermost layer containing the concentrating agent and one inner layer containing the reactive agent sufficient to form a colored compound on the surface of layer 11.

The multi-layer device of the present invention has found particular and significant utility in the detection of the morphine in a solution and particularly in urine. Specifically, a new process mechanism for forming a visually observable color from morphine has been discovered which has a sensitivity at morphine levels in solution or urine of approximately 10 to 20 micrograms per milliliter or above.

It has been found that the reaction of morphine with pyridine and a periodate reagent selected from the group consisting of paraperiodic acid or a soluble salt or an ester thereof converts morphine to a chromogenic compound which may be further reacted to produce a visually observable color.

By "soluble salts and esters" it is meant to include those salts and esters which are soluble in the test solution with which the test device is in contact. The new reaction sequence produces a color reaction with morphine in a solution (including a body fluid solution such as urine) in the presence of a large number of other chemical constituents and is specific to morphine. Reaction to the morphine-containing solution containing the mixture of pyridine (or similar heterocyclic base) and a periodate reagent selected from the group consisting of paraperiodic acid or a soluble salt or an ester thereof produces a chromogenic compound of currently unknown composition. Reaction of the solution containing the chromogenic compound with a strong base such as sodium hydroxide or sodium methoxide leads to the rapid development of an intense blue color at a pH of about 11 which changes to a rose color at about pH 13. Acidification of the pH downward to below 7 produces a bright yellow color. It is important that the addition of the pyridine and periodate reagent preceed the addition of the alkali in order to form an intense, stable color.

This color-forming reaction for morphine has been found not to occur, i.e., to give a negative color reaction, with other compounds likely to be found in urine such as the phenolic catecholamines, vanilmandelic acid, estrone and estriol as well as salicyclic acid itself.

The above-defined process for morphine detection can be incorporated into the multi-layer devices of FIGS. 1, 2, 3, 4, or 5 to provide a specific device suitable for the colorimetric determination of the presence of morphine in solutions and body fluids in the range of interest to those concerned with morphine and heroin addiction. When incorporated into the multi-layer device described herein, the sensitivity of the new color reaction or morphine is extended downward to a morphine level about 1 microgram per milliliter which is generally about the lower limit of morphine found in urine or heroin addicts.

Specifically, in the case of the multi-layer device developed for determining the morphine presence or absence in 25 to 50 milliliters of urine containing morphine at concentrations equal to or greater than about 1 microgram per milliliter, the outermost or concentrating layer 11 can include a morphinophilic material such as an acidic material which will react with the basic groups of the morphine. The concentrating layer can be formed, for example, from a paper strip which has been treated with maleic anhydride or an ethylene-maleic anhydride copolymer to provide a paper layer having reactive carboxyl groups.

Alternatively, paper may be reacted with chlorosulfonic acid in a chilled, dilute solution of carbon tetrachloride to provide a paper containing free sulfonic acid groups.

The concentrating layer 11 can also be formed from a cationic exchange resin-containing paper, such as "SA-2" paper, supplied by the Reeve-Angel Co. of Clifton, N.J., in which a cation exchange resin ("Amberlight IR-120", Rohm and Haas Co., Philadelphia) is embedded in the paper sheet. The "SA-2" paper may be utilized in the commercial form as the sodium salt of the sulfonic acid cation exchange resin or the resin may be converted to the acid form by treatment with concentrated hydrochloric acid.

The concentrating layer contains the morphinophilic agent in an amount suficient to react, attract or otherwise concentrate the morphine present in the solution onto the layer 11. Generally, the morphinophilic agent will be present in a large excess over the milliequivalent level of maximum morphine present, e.g., generally at least $10^5$, often at least about $10^6$, milliequivalents of morphinophilic agent per milliequivalent of morphine in the solution.

The inner layer 13 can contain the pyridine and periodate reagent selected from the group consisting of paraperiodic acid and its soluble salts and esters. Generally, the substrate of inner layer 13 may consist of a suitable permeable, non-reacting material such as a cellulosic fibrous material (e.g., Whatman No. 1 or Whatman No. 90 paper) or glass fiber filter paper (e.g., Whatman GF-A or GF/C paper) which has been impregnated with the pyridine and periodate reagent and dried.

The inner layer 13 contains the pyridine and periodate reagent in an amount sufficient to react with the morphine present in concentrating layer 11 to form a chromogenic compound. Generally, the inner layer 13 contains at least about 500, generally at least about 1000, milliequivalents of the pyridine and periodate reagent per milliequivalent of morphine. The pyridine and periodate reagent mixture itself generally contains from about 40 to about 80, preferably from about 50 to about 75, mole percent pyridine and concomittantly, from about 20 to about 60, preferably from about 25 to about 50, mole percent periodate reagent.

Typically, when paraperiodic acid is utilized as the reagent, the acid and the pyridine are first reacted in the absence of any solvent in amounts of approximately 1 mole paraperiodic acid to 2 moles pyridine. An insoluble white material (which is assumed to be the equivalent salt formed from pyridine and paraperiodic acid) is formed. This white material is stable when dry at room temperature but decomposes somewhat explosively at about 167°C. This white pyridine-paraperiodic acid reaction product may be deposited on the substrate of layer 13 in any convenient manner such as by dissolving the said reaction product in a water-pyridine mixture (containing from about 80 to about 98, preferably from about 85 to about 95, weight percent pyridine and, concomittantly, from about 2 to about 20, preferably from about 5 to about 15, weight percent water) and impregnating the substrate with the solution, or preferably by forming a slurry of the reaction product in an organic solvent in which it is not soluble and depositing the reaction product on the substrate.

The next inner layer 15 includes a strongly basic material such as sodium hydroxide or sodium methoxide which is capable of producing a visually observable color upon its diffusion and reaction with the chromogenic morphine compound described above. This layer 15 may, for example, be formed by impregnating a permeable strip (such as paper, cotton or glass fiber) with a solution of sodium hydroxide or sodium methoxide and drying to produce a layer containing sufficient base to react with the chromogenic morphine compound and produce a visually observable color, which amount generally can be from about 2 to about 20, preferably from about 3 to about 10 milliequivalents of strong base per milliequivalent of pyridine and periodate reagent.

In the construction of the preferred embodiment shown in FIG. 4, the strong base material is not incorporated into a fibrous substrate but is contained in a receptacle area 19' formed in the backing layer 16'. In this embodiment, the strong base 20' (e.g., sodium hydroxide) in the receptacle area 19' is present in solid form covered with a barrier layer 12'.

The receptacle area construction as shown in FIG. 4 is advantageous for morphine detection since it simplifies incorporation of the strong base into the device.

All of the various layers in the multi-layer composites described herein may be attached to the outer layers with a suitable adhesive, preferably a hot melt cement such as a polyamide powder or a polyethylene powder, both available from Virkotype, Inc., Plainfield, N.J., which seals each layer to the adjacent layer or layers without detrimentally affecting the permeability of the layers and/or the composite.

The multi-layer composite may be attached to the backing material 16' in any suitable manner, preferably by a hot melt cement such as described above applied to the edges of the composite.

In use, the composite device is inserted into the test solution, such as urine, contained in a wide-mouth bottle or beaker and generally present in an amount of 25 to 50 milliliters. After about 10 to 15 minutes or less, a visually observable color begins to form on the surface of the concentrating layer of the device if morphine is present in the composite in an amount about 1 to 2 micrograms per cubic centimeter of solution. When the substrate in the concentrating layer 11' contains carboxy groups (e.g., a maleic anhydride containing paper), a red color forms and when the substrate contains sulfonic acid groups (e.g., SA-2 type paper), a blue color forms.

With the use of a morphinophilic agent such as described above to concentrate the amount of morphine in a particular solution and thus to build up the color to a readily observable color upon final reaction, morphine may be detected in an extremely minor amount in a solution, e.g., in an amount of 1 part per million or more.

The invention is additionally illustrated in connection with the following Examples which are to be considered as illustrative of the present invention. It should be understood, however, that the invention is not limited to the specific details of the Examples or to the specific embodiments described herein. The general principles herein taught being applicable to a tremendous variety of color reactions beyond those described.

EXAMPLE 1

A number of three layer devices capable of detecting morphine in dilute amounts in a solution are prepared. For each device, Reeve-Angle "SA-2" paper (14 mil thickness) and containing about 50 percent by weight of a sulfonic acid cationic ion exchange resin ("Amberlight IR-120", Rohm and Haas Co.) is used as the concentrating layer.

A 7 mil thickness of Whatman No. 1 filter paper is contacted with a solution containing 5 grams of an equimolar salt of pyridine and periodic acid, 20 grams of pyridine and 2 cc of water to impregnate the filter paper which is thereafter dried. The dried filter paper contains 20 mg of pyridine and periodate reagent per 168 $mm^2$ of filter paper.

Another (third) layer is prepared of Whatman No. 1 filter paper (7 (7 thickness) which has been impregnated with a sodium hydroxide solution and dried to provide a dried filter paper containing 30 mg. of sodium hydroxide per 168 $mm^2$ of filter paper. These layers are edge-sealed with a polyamide powder by hot melt adhesive techniques and attached with the same powder on the face of an impermeable 50 mil thickness (4 inch long × ¾ inch width) polyethylene backing.

An intermediate barrier layer is prepared by interposing two 7 mil thicknesses of Whatman No. 542 filter paper between the reagent-containing layer and the third (strong base-containing) layer.

These devices are contacted with aqueous test solutions containing 0, 1, 2, 5, 20 and 50 micrograms of morphine per milliliter of solution. In each run, the device is immersed in the solution. In less than about 10 minutes, each device contacted with a morphine-containing solution forms deep blue-violet color on its outer surface. Although the device immersed in the 1 mg/ml solution develops a color, the developed color is a shade lighter than the colors developed with the 2, 5, 20 and 50 mg/ml solution. The device contacted with the control (i.e., 0 mg/ml morphine) solution does not show any color formation after 30 minutes.

EXAMPLE 2

The devices and tests of Example 1 are repeated except that a receptacle area is first formed in the backing layer and sodium hydroxide crystals are placed therein. The third layer is thereafter omitted in the construction of the device. The results obtained correspond to those obtained in Example 1.

EXAMPLE 3

The multi-layer device of Example 1 is again prepared without, however, the sodium hydroxide-containing layer. Instead, the impermeable backing material is adhesively applied directly to the pyridine and sodium periodate-containing glass fiber filter paper layer. The two-layer device is contacted with a solution which contains about 1 microgram per milliliter of morphine for about 15 minutes and is thereafter immersed in a strongly basic aqueous solution containing about 5 percent by weight of sodium hydroxide. A deep blue-violet color appears on the surface of the device after about 10 minutes.

EXAMPLE 4

Example 1 is repeated using urine samples as the test solutions. The urine samples are first measured by thin layer chromatography and are found to contain about 2, 5, 10 and 0 mg/ml of morphine. The three layer devices immersed in the 2, 5 and 10 mg/ml morphine solutions develop visually observable deep blue-violet colors on their outer surfaces within about 10 to 15 minutes. The device immersed in the control (0 mg/ml morphine) solution did not develop any visually observable color even after 30 minutes.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A reactive test device capable of converting morphine to a chromogenic compound comprising
   a first portion including a morphinophilic agent and
   a second portion including a periodate reagent for morphine capable of reacting with morphine to produce a chromogenic compound which produces a visually observable color at a pH of about 11 to 13.

2. The reactive test device of claim 1 further comprising a third portion including a color forming agent capable of reacting with the said chromogenic compound to produce a visually observable compound.

3. The reactive test device of claim 2 further comprising a non-reactive backing portion being at least substantially contiguous with the other portions.

4. The reactive test device of claim 3 wherein said backing portion includes a handle portion extending outward from said substantially contiguous portion.

5. The reactive test device of claim 2 wherein said morphinophilic agent is an acidic material, said periodate oxidizing agent is paraperiodic acid or its soluble salts and esters and pyridine and said color forming agent is a basic material.

6. A multi-portion test device suitable for the colorimetric detection of morphine in a solution by contact therewith comprising:
   a first portion containing a morphinophilic agent whereby
   morphine in a contacted solution is concentrated in said first portion;
   a second portion containing a reagent capable of converting morphine to a chromogenic compound, said reagent comprising pyridine and a compound selected from the group consisting of paraperiodic acid and its soluble salts and esters; and
   a third portion containing a strong base
   said portions being arranged whereby when the test device is contacted with the said solution, the reagent, base and reaction products thereof may permeate through all the portions to form a visually observable color on said first portion.

7. The test device of claim 6 wherein at least one said portion is a strip of permeable, non-reactive material.

8. The test device of claim 7 wherein said test device further includes a rigid, impermeable material including a backing portion substantially contiguous with the said portions and a handle portion extending outwardly therefrom.

9. The test device of claim 6 wherein said morphinophilic agent is an acidic cationic exchange resin, said reagent capable of converting morphine to a chromogenic compound is pyridine and paraperiodic acid and said strong base is sodium hydroxide or sodium methoxide.

10. A process for detecting morphine in a solution which comprises mixing said solution with a periodate reagent and pyridine to convert any morphine present to a chromogenic compound and contacting the resulting solution with a strong base to form a visually observable indication of the presence of morphine.

11. The process of claim 10 wherein said solution is a urine solution.

12. The process of claim 10 wherein said periodate reagent is paraperiodic acid or its salts and esters.

13. The process of claim 12 wherein said strong base is sodium hydroxide or sodium methoxide.

* * * * *